Sept. 18, 1934. F. DUSTAN 1,973,801
BILLET PEELER
Original Filed May 2, 1928 6 Sheets-Sheet 1

Sept. 18, 1934.                F. DUSTAN                     1,973,801
                              BILLET PEELER
                    Original Filed May 2, 1928    6 Sheets-Sheet 2

Sept. 18, 1934.   F. DUSTAN   1,973,801
BILLET PEELER
Original Filed May 2, 1928   6 Sheets-Sheet 4

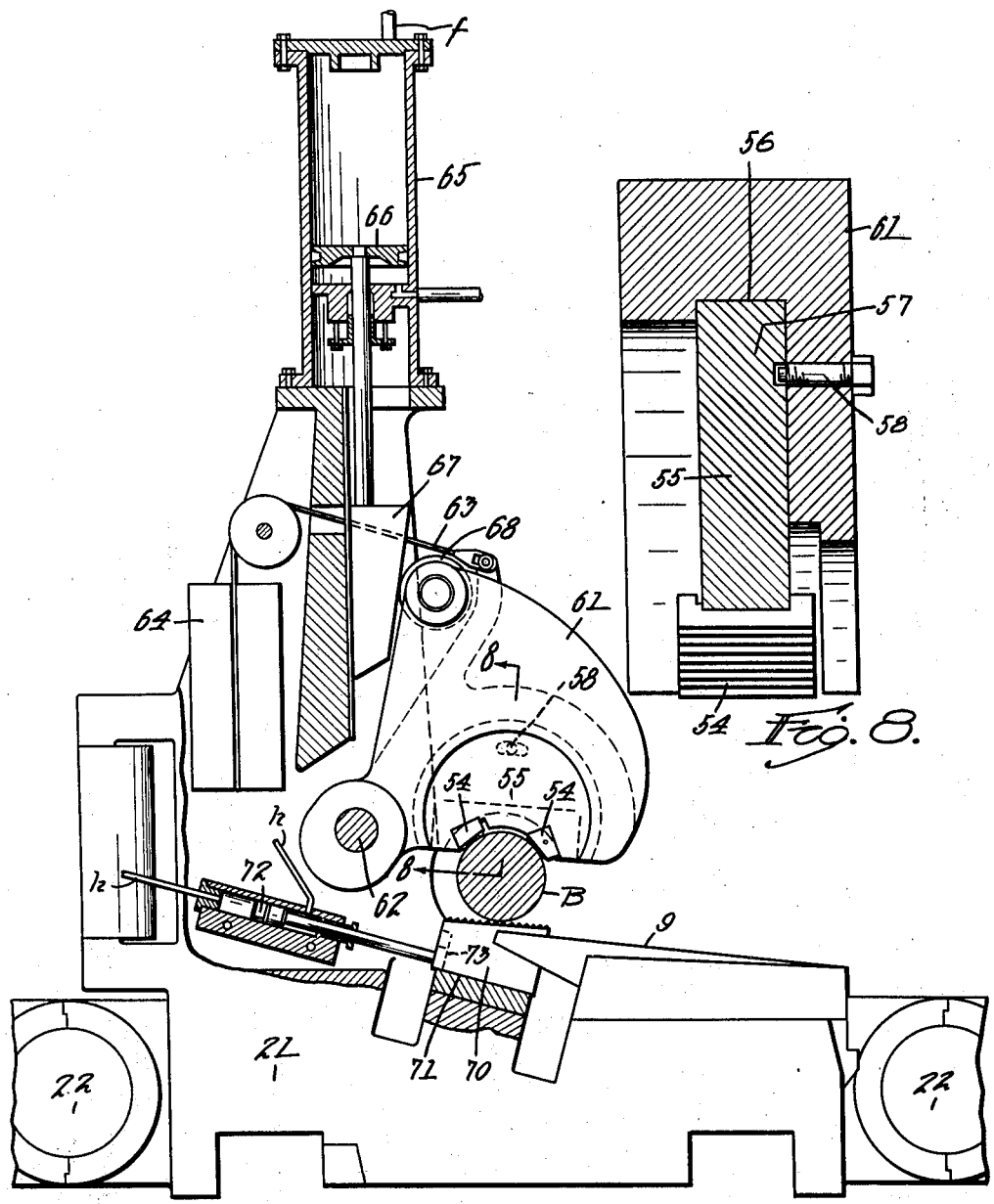

Sept. 18, 1934.     F. DUSTAN     1,973,801
BILLET PEELER
Original Filed May 2, 1928    6 Sheets-Sheet 6

Inventor
Frank Dustan
By Attorneys

Patented Sept. 18, 1934

1,973,801

UNITED STATES PATENT OFFICE 1,973,801

BILLET PEELER

Frank Dustan, Fitchburg, Mass., assignor to Shaw Crane-Putnam Machine Company, Inc., New York, N. Y., a corporation of Delaware Application May 2, 1928, Serial No. 274,636
Renewed July 2, 1934

12 Claims. (Cl. 82—20)

This invention relates to a machine for rapidly turning the surface to a uniform depth, from unstraightened round billets. The term "uniform depth" means that the centers of gravity of the rough section and of a finished section approximately coincide, the cut following the camber of the billet. The machine is of the type in which the billet is forced through a rotating cutter.

The principal objects of the invention are to provide work grips for grasping the billet at one end and pushing it through the cutter from one side and then grasping it on the other end and pulling it the rest of the way through, of such a nature that they will effectively grip the billet; to provide work grips on the discharge side in an adjustable form so that they can be brought into contact with the billet as it projects through the die in whatever position it may be, due to the camber, and adjust themselves so that they will grip the same in this position without any tendency to force the end into a position coinciding with the center of the machine, before pulling it through, thus producing uniform depth of cut; to provide effective and powerful means for forcing the upper jaw or jaws of the work grip into contact with the work of such a nature that it can be operated by a cylinder and piston arrangement under fluid pressure; to provide this forcing device with means whereby it will be forced down gradually about a pivot into engagement with the billet and means for automatically drawing it back when the piston is raised; to provide means whereby the jaws can be adapted to move slightly to accommodate the position of the billet; to provide improved means for operating the work grips to force the slides on which they are mounted toward and from the work and allow them to feed back automatically, and to provide hydraulic means for accomplishing the last result of such a nature that the water will be allowed to escape to permit of the drawing back of the carriages automatically without attention.

The invention also involves a self-contained rotary cutter and means by which it can be removed and replaced in a convenient manner.

Other objects and advantages of the invention will appear hereinafter.

Reference is to be had to the accompanying drawings in which

Fig. 5 is an enlarged sectional view of one of the billets showing the details of the clamping jaws for feeding-in;

Fig. 7 is a sectional view on the line 7—7 of Fig. 1 showing the feeding-out grips and the means for operating the same;

Fig. 8 is an enlarged sectional view on the line 8—8 of Fig. 7;

Figure 1:
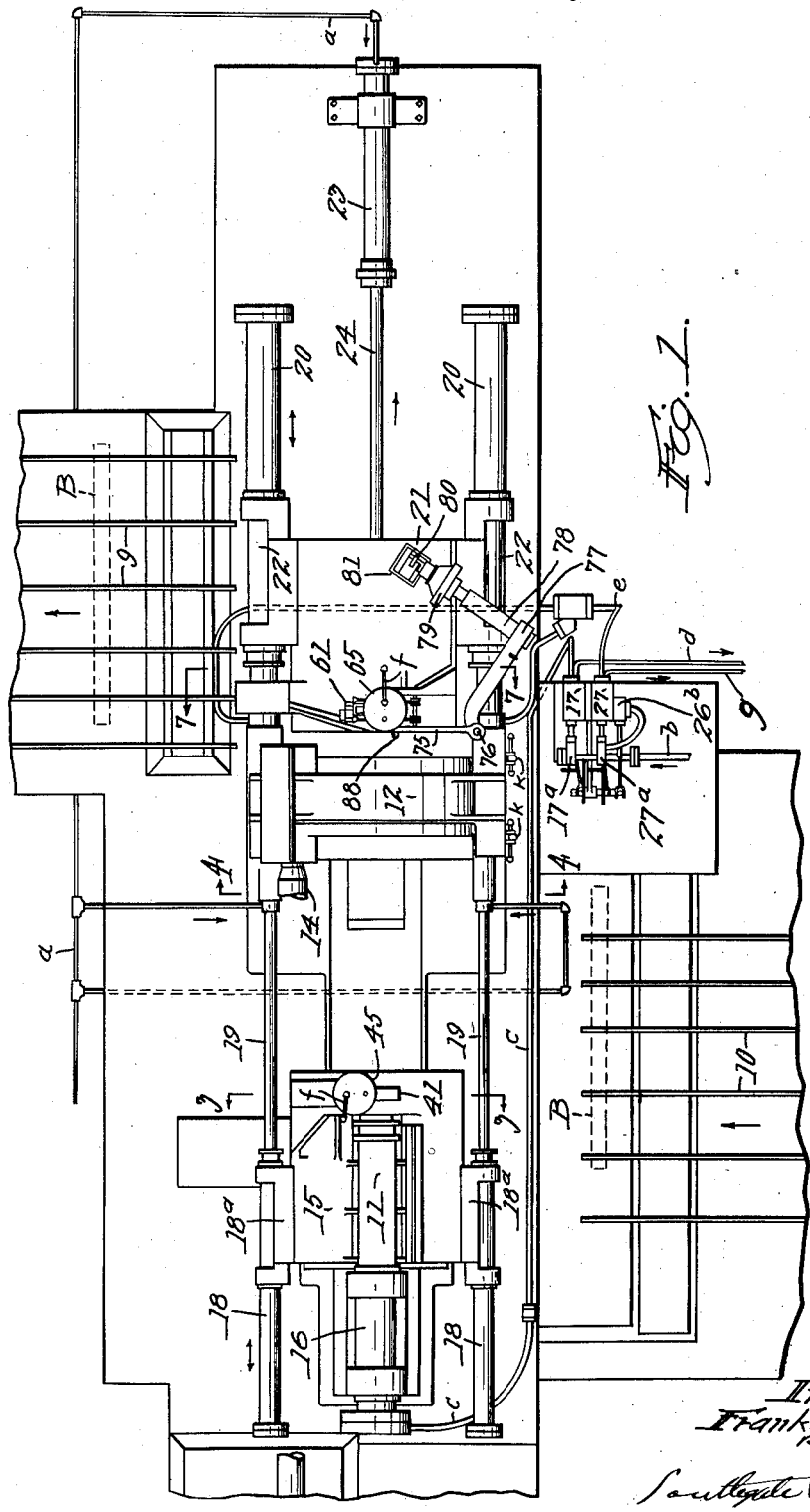
Fig. 1 is a plan of a machine constructed in accordance with this invention with some details of construction omitted.
Figure 2:
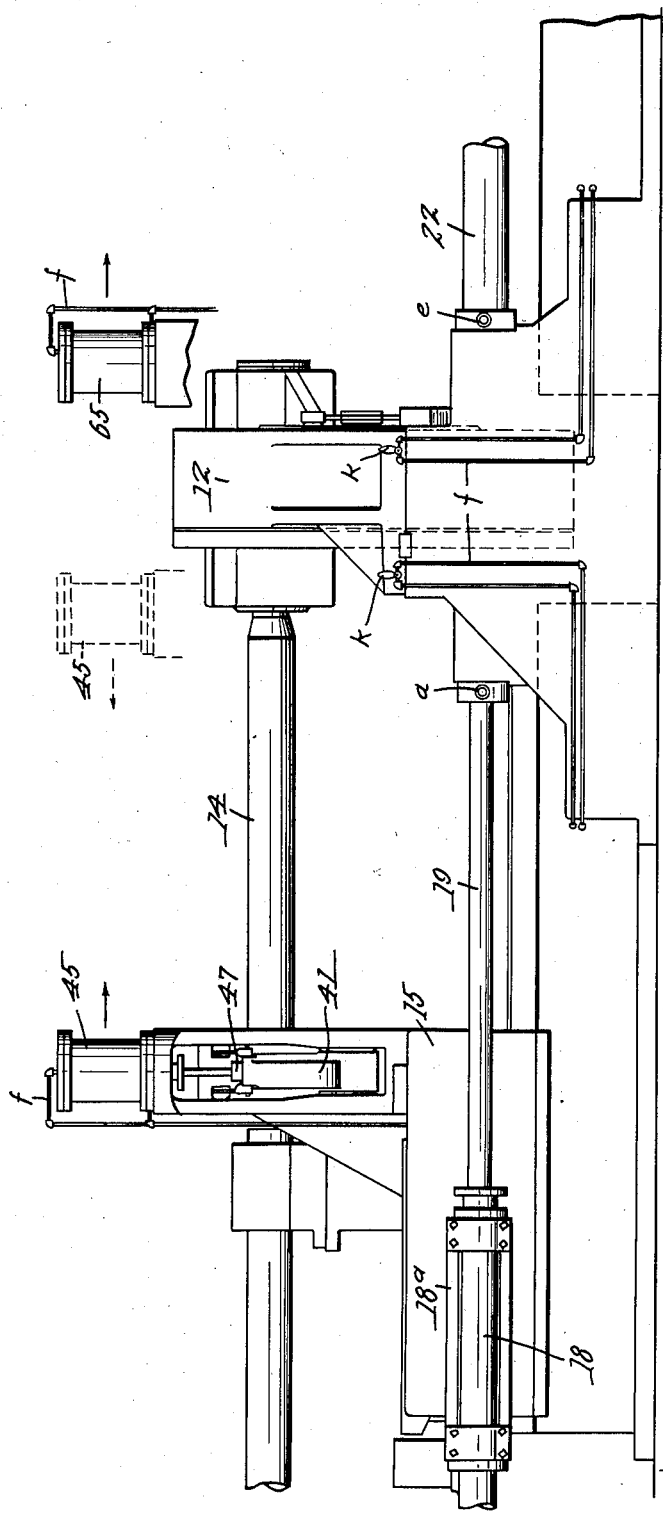
Fig. 2 is a side view of a means for pushing in the billet toward the die.
Figure 3:
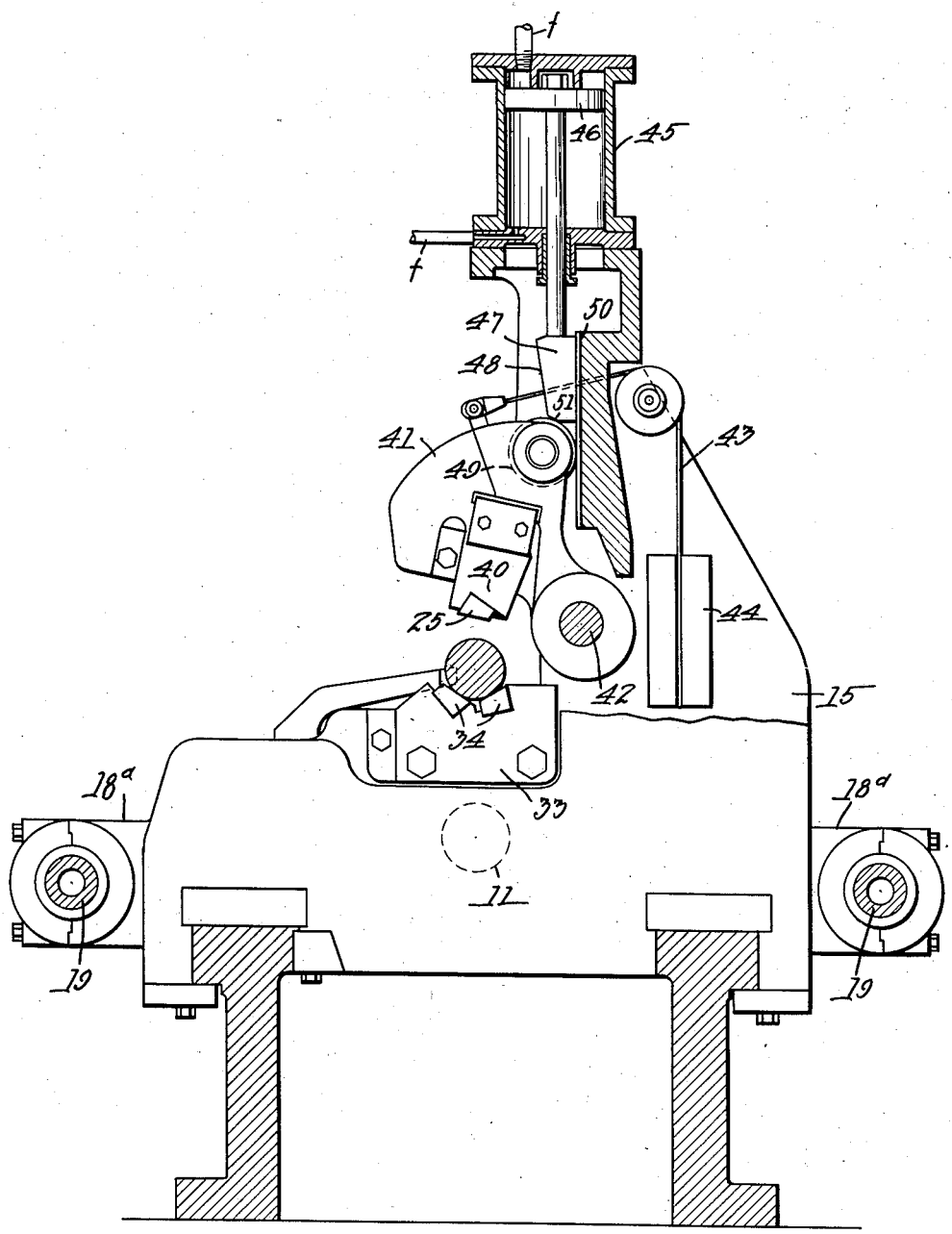
Fig. 3 is a sectional view on the line 3—3 of Fig. 1 showing the feeding-in work grips and means for operating the same.
Figure 4:
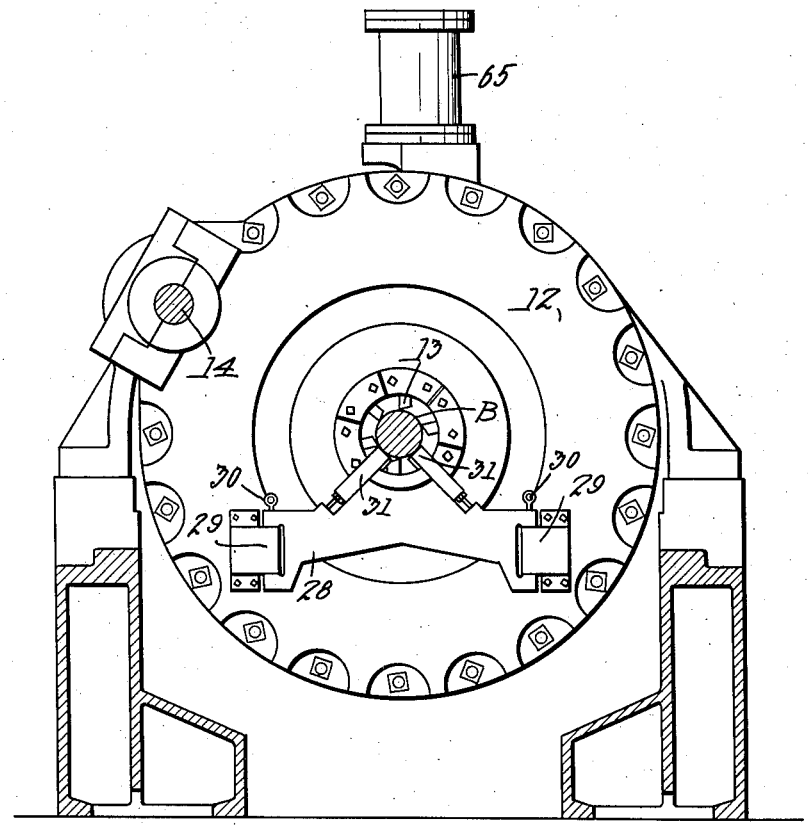
Fig. 4 is a sectional view on the line 4—4 of Fig. 1 showing the die or cutter head in elevation.

Referring first to Fig. 1, which shows the machine in full, it will be enough to state that unstraightened billets B are brought into the machine on a feeding-in rack 10 from which they are lifted by a crane, or other mechanical means, into the machine in a central position without changing their direction. They are then gripped as will appear later, and forced inwardly through a peeling die casing 12 in which is a rotary cutter or die 13. This cutter is rotated constantly from a shaft 14 in a well-known manner and by means not shown herein. The billet is gripped by another work grip on the other side and drawn through the peeling die. It is then discharged from the machine, preferably by gravity, onto a feeding-out rack 9.

The billets which are peeled in this machine are six inches in diameter up to twelve inches and they are put in the machine without previous truing-up or straightening ordinarily. Many of these billets are curved and it has been found in practice that, with the ordinary methods, in which the cutter is stopped when the grip is changed, the product is rocked in the cutters as it is gripped at the discharge end, occasionally breaking the cutters, especially when the curvature is excessive.

One of the objects of this invention is to insure that they will be turned from end to end without stopping the cutter head while changing grips. The rotary cutter will operate on the billets from end to end so that if a billet is crooked the cutter will take the same amount of metal off all sides and leave the finished product with a turned surface substantially concentric with the original distorted center line.

The feeding-in and drawing-out parts of the machine are operated hydraulically in the form shown. At the feeding-in end of the machine is a carriage 15 which is adapted to reciprocate toward and from the rotary cutter 13 to carry the billets up to it centrally. On the other side of the cutter is a carriage 21 movable in a similar way to draw the billets through the rest of the way. Both these carriages reciprocate on ways on a bed. The carriage 15 is operated forward on the working stroke by a feed plunger 11 secured thereto and movable therewith and having its piston located in a stationary cylinder 16 fixed on the bed. At the sides are two smaller pull-back cylinders 18 which are fixed to the carriage by brackets 18$^a$ as shown and are provided with stationary hollow pistons or plungers 19 which are fixed to the bed.

These cylinders are supplied with water from a pressure main $a$. This has branches entering the hollow piston 19 near the casing 12 and the pressure is always on the two side cylinders 18, tending to force these cylinders away from their pistons and push the carriage 15 back. The main $a$ is also connected with a pipe $b$ which, by means of two two-way poppet valves 17 and 27, provide certain connections. The valve 17, when open, allows connection between the pipe $b$ and a pipe $c$ to conduct water into the rear of the cylinder 16. Therefore when this poppet valve is open, although there is pressure on the ends of the two pistons 19 from the main source of supply, the area of the cylinder 16 is so much greater that it will force the carriage up toward the cutting die. However, when the valve 17 is closed again, no more water can pass to the cylinder 16 and there is no pressure behind it. Therefore the pressure in the cylinder 16 comes out through pipe $c$ and waste pipe $d$ through which it is free to flow on account of the position of the valve 17. Needle valves 17$^a$ and 27$^a$ are interposed between the line and the poppet valves to control the speed.

In a similar way, at the other end, the pipe $a$ is connected constantly to the pull back central cylinder 23 so as to keep pressure on it at all times. Also the two-way poppet valve 27 delivers from the pipe $b$ to a pipe $e$ which is branched and conducts water under pressure through two side feed pistons 22, which have longitudinal passages, to their respective cylinders 20. The cylinders 20 and piston 24 are fixed to the carriage 21. The pistons 22 and cylinder 23 are stationary. When this pressure is on, these two cylinders overcome the constant pressure in the cylinder 23 and move the carriage 21 back to draw the billet through and finish it as well as deliver it. When the valve 27 is closed, the pressure on the two cylinders 20 being relieved, the piston 24 will move forward and restore the carriage to its starting position. When the carriage is forced forward in this way the water is released by the closing of the valve 27 and the piston 24, on which pressure is active at all times, will be free to force the carriage forward to get another grip. The water in the cylinder 20 is exhausted through the pipe $g$, controlled by the valve 27. There is a single poppet type by-pass valve 26$^b$ which, when open, allows the water to pass around the speed control needle valve 27$^a$ to allow the discharge side carriage 21 to rapidly traverse back until the billet has cleared the cutter head after it has passed through the cutters.

It will be noticed that there is a bracket 28 which is pivoted at both ends to projections 29 on the casing 12 by means of pins 30 which can be withdrawn to release this bracket. The bracket is provided with adjustable rests 31 for the billet as it enters the cutter 13.

Figure 5:
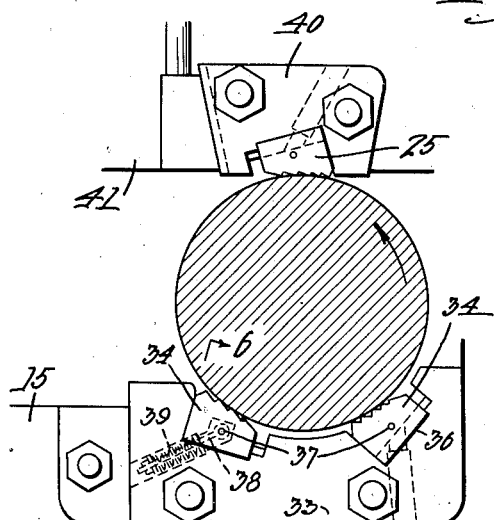
Figure 6:
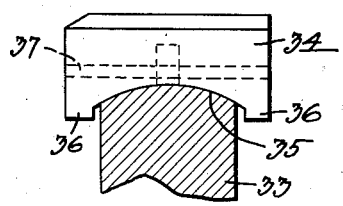
Fig. 6 is an enlarged sectional view on the line 6—6 of Fig. 5.

On the feeding-in carriage 15 is provided a work grip support or adapter 33 for a pair of lower jaws 34 and an upper adapter 40 for an upper jaw 25. These jaws 34 and 25 are all mounted on convex surfaces 35 of the work grip support so that they are capable of a slight rocking motion and they have ears 36 projecting down for limiting this motion. Each one is also provided with a cross pin 37 on which is pivoted a rod 38 having a spring 39 thereon resting in a cavity in the adapter 33, abutting against a shoulder, and holding the jaws at the bottom of their wedge-shaped seats as shown in Fig. 5. When the billet is gripped, due to the torque of the cut it tends to turn in the direction indicated by the arrow in Fig. 5, and as the torque increases in the billet, the jaws slide farther into the wedge-shaped space between the work and work grip support and grip proportionately tighter.

At the top the jaw adapter or support 40 carries a single jaw like those described and working in the same way. The jaw adapters 33 and 40 are detachable and replaceable by adapters of different sizes in accordance with the diameters of the billets to be acted upon.

The adapter 40 is mounted on an arm 41 pivoted on a stud 42 on the carriage 15. This arm is provided with a flexible member 43 and weight 44 to draw it back normally, to bring the jaw carried thereby out of contact with the work.

For the purpose of forcing this upper jaw down into contact with the work I have provided a cylinder 45 adapted to be operated by compressed air or other fluid and a double acting piston 46. On the rod of this piston is a wedge 47 which has a slant on its operative surface 48. This slant or angle is of a low degree and is adapted to engage a roll 49 adapted to freely rotate on a stud on the arm 41. This wedge 47 runs in ways 50 arranged vertically on the part of the carriage which extends upwardly and supports the cylinder 45. The wedge preferably is slanted more abruptly at 51 and so that when it comes down it will force itself in behind the roll 49 and then when the jaw 25 gets down nearly into contact with the work, the roll 49 will be operated on by the slanting side 48 of the wedge to force it firmly down into contact with the billet under the elastic pressure behind the piston. This pressure is supplied by any ordinary piping $f$ and controlled by valves located conveniently for the operator.

If the billets are practically straight or if they are straightened before they are placed in the machine, the same work grip can be used on the discharge end of the machine. However, to adapt the machine for taking curved billets as they come from the mill, I prefer to provide a work grip for the discharge carriage 21 of somewhat different character. In this case I provide two jaws 54 on the top, these jaws being constructed like the jaws 34 preferably and being located on a plate 55 which is of a segmental circular form and mounted in a groove 56 of the same form. This plate 55 is provided with a concentric slot 57 and a bolt 58 projecting into it to limit the motion of the plate 55 about its center. This constitutes a freely self-centering support for the two jaws 54. The groove 56 is formed in a lever 61 pivoted on a stud 62 and the bolt 58 is carried by this lever. This lever is moved upwardly by a flexible connection 63 and weight 64 as in the other case and the carriage 21 is provided with a cylinder 65 like the cylinder 45 operating a piston 66 and wedge 67 shaped like the wedge 47. This wedge engages a roller 68 like the roller 49 and acts in all ways the same as in the case of the feed-in work grip.

For the purpose of adjusting this work grip to the steel billet as it comes through a cutter, I have provided a steel jaw 70 below. This jaw has a toothed surface, as have all the jaws, and is adapted to slide back and forth on a slanting surface 71 so as to adjust it just into contact with the bottom of the billet B as it comes through. This jaw is moved back and forth by a plunger 72 supplied with air from any desired source through pipes h and controlled as desired, as by valves k.

It will be seen that when the jaws 54 are brought down on the billet B, as one of them strikes it first, the plate 55 will be forced to turn around a little on its axis until the clamping of the two jaws on the billet is equalized. In operation the lower jaw 70 is pulled up the incline to a place where it will engage the billet in any position in which it is fixed by the cutting blades and the work grip on the feeding in end of the machine. This lower jaw 70 has a T-shaped slot 73 for receiving the end of the piston 72.

The jaw supports 33, 40 and 55 are called adapters. The adapters are replaced by larger or smaller ones so as to clamp work of various diameters. By the use of the mechanism shown, the stopping of the cutting head 12 and releasing of the entering side grip before the discharge grip is applied to the work has been eliminated. This releasing of grips midway in the operation resulted in the tilting of the billet in the cutter head which caused occasional breakage and loss of time, but by the present arrangement of two kinds of grips, the entering grip and the cutting blades are kept in position while the billet is being gripped by the jaws on the pulling out carriage 21. In this manner a billet which is considerably warped out of shape can be peeled with a uniform depth of cut regardless of its original straightness.

This improvement in the work is accomplished by this machine without adding greatly to the expense and it does away with the necessary waste of time which takes place when the cutting blades are stopped each time, between the pushing and pulling actions. The hydraulic action by which the cylinders at both ends are operated and controlled is smooth and does not require the attention of the operator except to turn the valve for controlling the action of the cylinder for moving the carriage in one direction. The backward movement is taken care of automatically without the use of a separate valve or other controlling device.

Figure 9:
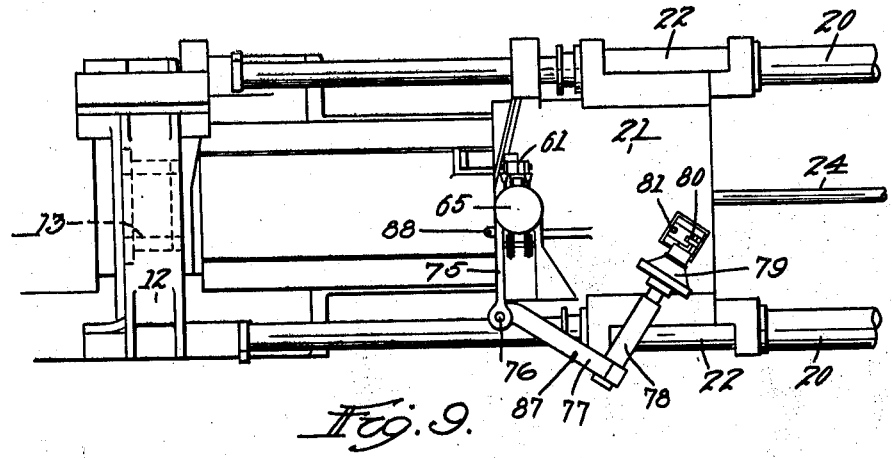
Fig. 9 is a plan of a portion of the machine like Fig. 1 showing the parts in a different position.
Figure 10:
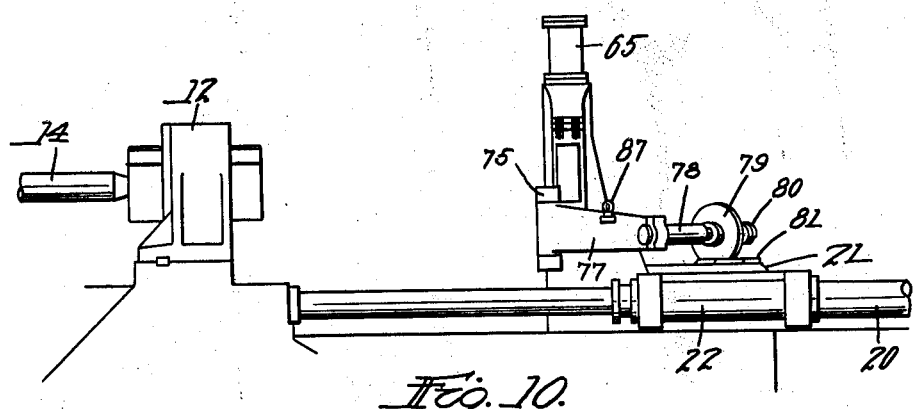
Fig. 10 is a side view of the same.
Figure 11:
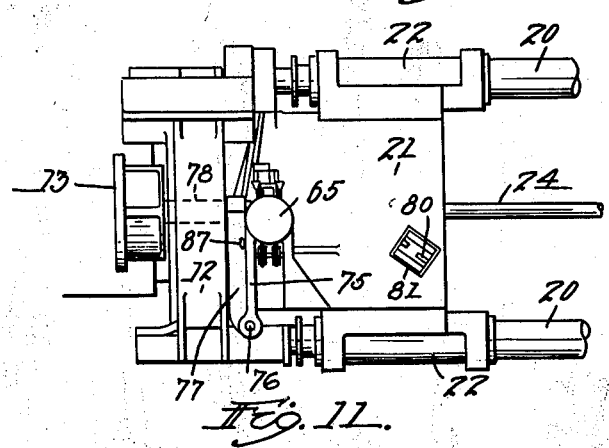
Fig. 11 is a plan showing the means for supporting the cutter head, in active position.

Referring to Figs. 9, 10 and 11 it will be seen that I have provided on the carriage 21 at the side near the cutter head, a bracket 75 having a vertical pivot rod 76 which supports an arm 77 normally in the position shown in Fig. 9. This arm is provided with a mandrel 78 extending at right angles on which there is a conical centering and supporting head 79. In the position shown in this figure and in Fig. 10 this is held back by a catch 80 on a platform 81 mounted in fixed position on the carriage. This catch is pivoted and adapted to swing back.

The machine operates normally with the parts just described, located in the position shown in Figs. 9 and 10. When it is desired to change the cutter head 13 the arm 77 is swung around on its pivot 76 to the position shown in Fig. 11 and locked in this position by means of a pin 87 in the arm 77 being inserted in a hole in a lug 88 on the carriage 21. The carriage is backed up to the casing 12 where the head 79 enters the end of the rotary cutter or die 13 and then, when the carriage 21 moves further in the same direction, the die, of course, being released from the casing 12, this die will be pushed out as a unit.

From the position shown in Fig. 11 the die or cutter is removed by a crane or other lifting device, not shown. A new one is put in place and then moved up into the casing 12 in a corresponding way. Then the carriage 21 is drawn back and the arm 77 and its attached parts turned back to the position shown in Figs. 9 and 10. This constitutes a simple and convenient way of changing the cutters and handling them as a unit.

Two unskilled operators easily operate the machine to its maximum capacity, one operator on the hydraulic feed and air clamp valves and the other on the crane controls. A cutting sped of 40 feet per minute and a feed of ½" per tool, or 3" per revolution of the cutter head (there being six tools) is easily maintained.

It is interesting to note that on 8¼" diameter billets, being turned to 8" diameter, that approximately fifty-seven hundred and forty feet or four hundred and eighty tons, are easily handled in twenty-four hours, this leaving a liberal time allowance for changing tool holders, etc. A set of tools stands up for from three to four hours before becoming dull.

Although I have illustrated and described only a single machine showing two forms of gripping jaws I am aware of the fact that other modifications can be made therein by any person skilled in the art without departing from the scope of the invention as expressed in the claims. Therefore I do not wish to be limited to the exact form shown, but what I do claim is:—

1. In a billet peeler, the combination with a rotary cutter for peeling the billet, of a feed carriage, a stationary cylinder having a piston connected with said carriage for feeding the carriage forward and pushing the billet part way through the cutter, a pair of movable side cylinders mounted on the carriage, stationary piston rods for the side cylinders, means for supplying the last named cylinders with fluid under pressure from a source of power at all times, means for connecting the same source of power with the stationary cylinder, a valve for controlling the same, the area of the stationary cylinder being greater than the combined areas of the movable cylinders, whereby when the valve is turned to admit the fluid into the stationary cylinder, the pressure in the side cylinders will be overcome and the carriage will move forward on its working stroke.

2. In a billet peeler, the combination with a rotary cutter for peeling the billet, of a feed carriage, a stationary cylinder having a piston connected with said carriage for feeding the carriage forward and inserting the billet in the cutter, a pair of side cylinders mounted on the carriage, stationary piston rods for the side cylinders, means for supplying the side cylinders with fluid under pressure from a source of power at all times, means for supplying the stationary cylinder with water under the same pressure, a valve for controlling the same and opening the stationary cylinder to the exhaust, whereby when the valve is turned to stop the flow of fluid into the stationary cylinder and open it to the exhaust, the carriage will be moved back.

3. In a billet peeler, the combination with a hollow rotary cutter through which billets are adapted to be moved for peeling them, with a feed-in carriage, a hydraulic cylinder and piston for moving the carriage toward the cutter to insert the end of a billet in it and push it part way through, means for controlling the admission of water pressure to said cylinder, a pair of cylinders connected with the source of water pressure at all times and secured on said carriage, the latter cylinders having fixed pistons, whereby when water is admitted from the source to the first cylinder it will overcome the forces of the two cylinders and move the carriage forward and when the water communication to the fixed cylinder is stopped and the exhaust opened, the two cylinders will force it back again.

4. In a billet peeler, the combination with a hollow rotary cutter through which billets are adapted to be moved for peeling them, with a feed-in carriage, a hydraulic cylinder and piston for moving the carriage toward the cutter to insert the end of a billet in it and push it part way through, means for controlling the admission of water pressure to said cylinder, a pair of cylinders connected with the source of water pressure at all times and secured on said carriage, the latter cylinders having fixed pistons, whereby when water is admitted from the source to the first cylinder it will overcome the forces of the two cylinders and move the carriage forward and when the water communication to the fixed cylinder is stopped, the two cylinders will force it back again, and means on the other side of the rotary cutter for gripping the billet on that side while the cutter is operating, and the billet is held at the feed-in end on said carriage, and pulling the billet through the cutter the rest of the way.

5. In a billet peeling machine, the combinaiton of a hollow rotary cutter through which billets are adapted to be moved for peeling them, a feed-in carriage and feed-out carriage on opposite sides of the cutter, means on the feed-in carriage for gripping the billet at one end, means adjacent the cutter for supporting the billet at the other end, whereby the movement of the feed-in carriage will force the billet centrally through the cutter, and means on the feed-out carriage for gripping the billet when it protrudes and while the feed-in carriage is moving forward and the cutter is operating, with a pair of cylinders fixed on the feed-out carriage and having stationary pistons, whereby when the water is admitted to said cylinders the carriage will be drawn back on its working stroke, a cylinder connected with a source of water pressure at all times and located in stationary position and having a piston rod connected with the feed-out carriage, and means for conducting water into the first two named cylinders to draw the feed-out carriage back when this water connection is open in spite of the fact that the fixed cylinder is receiving water from the source of pressure at all times and whereby, when the water connection to the pair of cylinders is disconnected, the central cylinder will force the feed-out carriage back to a position for engaging the billet.

6. In a billet peeling machine, the combination with a hollow rotary cutter through which billets are adapted to be moved for peeling them, of a feed-in carriage and a feed-out carriage on opposite sides of the cutter, means on the feed-in carriage for gripping the billet at one end, means on the feed-out carriage for gripping that end of the billet when it protrudes beyond the cutter, a pair of cylinders fixed on the feed-out carriage and having stationary pistons, whereby when the water is admitted to said cylinders the carriage will be drawn back on its working stroke, a central cylinder connected with a source of water pressure at all times and located in stationary position and having a piston rod connected with the feed-out carriage, and means for conducting water from the source of supply to the two cylinders which are of larger combined area, to draw the feed-out carriage back when this water connection is open in spite of the fact that the fixed cylinder is open to the source of pressure at all times and whereby when the water connection from the source to the feed cylinders is disconnected the stationary cylinder will force the feed-out carriage back to a position for engaging the billet.

7. In a billet peeling machine, the combination with a hollow rotary cutter through which billets are adapted to be moved for peeling them, of a feed-out carriage, means on the feed-out carriage for gripping that end of the billet when it protrudes beyond the cutter, a pair of cylinders fixed on the feed-out carriage and having stationary pistons, a cylinder connected with a source of water pressure at all times and located in stationary position and having a piston rod connected with the feed-out carriage, and means for conducting water from the source of supply to the two cylinders which are of larger combined area to draw the feed-out carriage back when this water connection is open, whereby when the water connection from the source to the feed cylinders is disconnected the stationary cylinder will force the feed-out carriage back to a position for engaging the billet.

8. In a machine of the class described, the combination with a casing, a circular die having a passage therethrough for the work, said die being detachable in an axial direction from said casing, a carriage, and means supported by said carriage adapted to enter the rotary cutter and move it out of the casing by the movement of the carriage.

9. In a machine of the character described, the combination with a casing having a rotary cutter therein through which the work is adapted to be moved, a carriage having jaws thereon for engaging the work and moving it longitudinally in the cutter, an arm pivoted on said carriage, a mandrel carried by the arm and having a head adapted to enter the cutter and support it, whereby when the carriage is moved the cutter will be moved out of the casing.

10. In a device for removing a rotary cutter from a casing, the combination with a carriage adapted to be moved toward and from the casing, of an arm pivoted on the carriage on a vertical axis, a mandrel at right angles to said arm having a head for supporting the cutter, means on the carriage for supporting and holding the mandrel and head in a position on the carriage out of the way, said arm being adapted to swing around its pivot into a position at right angles to the direction of motion of the carriage, and means for locking the arm in this position, in which position the mandrel will be located in axial position with respect to the cutter and will be moved with the cutter thereon into and out of said casing.

11. In a work grip, the combination with a movable support, of a pair of jaws mounted to have a limited lateral free swinging motion thereon, a wedge-shaped seat for each jaw, yielding means for retaining said jaws in their seats, the rotation of the work acting to force them into the wedge, and a third jaw of similar nature adapted to engage the opposite side of the work.

12. In a work grip, the combination with a frame having a wedge-shaped seat, a jaw resting on the inclined surface of said seat and having teeth on its opposite surface, the inclined surface and jaw being so located that the rotation of the work on an axis perpendicular to the direction of motion of the jaw will tend to force the jaw up its inclined surface farther into the seat to increase the force with which it grips, a jaw on the other side of the work, and means for forcing the latter jaw positively against the work.

FRANK DUSTAN.